S. A. Garrison,
Boring Hubs.
Nº 25,190.   Patented Aug. 23, 1859.
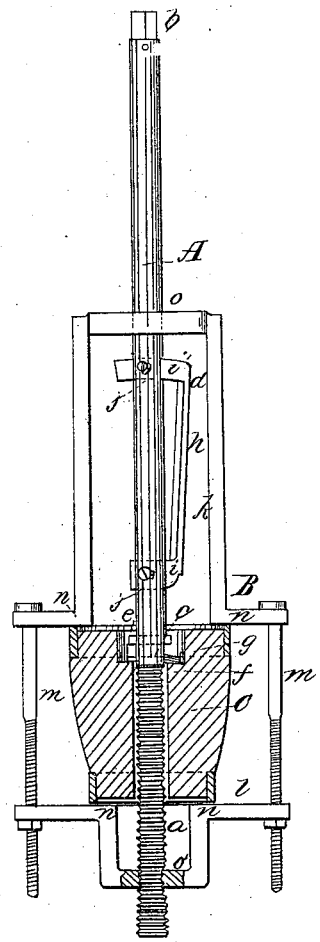
Witnesses.
John K. Edwards
J. B. White
Inventor.
Stacy A. Garrison

UNITED STATES PATENT OFFICE.

STACY A. GARRISON, UNION, NEW YORK.

HUB-REAMER.

Specification of Letters Patent No. 25,190, dated August 23, 1859.

*To all whom it may concern:*

Be it known that I, STACY A. GARRISON, of Union, in the county of Broome and State of New York, have invented a new and Improved Implement or Device for Boring Taper-Holes in Hubs to Receive Their Boxes; and I do hereby declare that the following is a full, clear, and exact description of the same, reference being had to the annexed drawing, making a part of this specification, said drawing being an elevation of my invention.

To enable those skilled in the art to fully understand and construct my invention I will proceed to describe it.

A, represents an arbor or shaft, on one end of which a screw thread $a$, is formed, at the opposite end a square $b$, is formed to receive a crank with which to turn the arbor or shaft. In the arbor A, two cutters $c$, $d$, are secured. These cutters are of course constructed of steel, and one of them $c$, is fitted transversely in the arbor and secured in proper position by a key or wedge $e$. The cutter $c$, is formed of a straight cutting edge $f$, at or about at right angles with the arbor and a small spur $g$, having a cutting edge parallel with the arbor, said cutter acting precisely similar to the cutting portion of a screw auger. The cutter $d$, is formed of a blade $h$, having tangs $i$, $i'$, at right angles to it at each end, said tangs being fitted in the arbor at right angles and secured therein by set screws $j$, as shown clearly in the drawing. The upper tang $i'$, is slightly curved as well as the slot in which it is fitted so as to admit of a lateral adjustment of the blade $h$, from the lower set screw $j$, as a center.

B, is a clamp which is formed of two bent metal bars $k$, $l$, connected by screw bolts $m$, $m$, as plainly shown in the drawing. The parts of the bars $k$, $l$, that are parallel with each other as shown at $n$, $n$, form the surfaces that grasp the hub, the other parts support bearings $o$, $o'$, for the arbor at proper parts or distances from the hub, the lower bearing $o'$, having an internal screw thread and performing the function of a nut as well as a bearing.

The implement is used as follows: The arbor A, is passed through the mandrel hole of the hub C, to be bored, the screw part $a$, of the arbor fitted in the lower bearing $o'$, of the part $l$, of the clamp B, and the two parts $k$, $l$, secured together by the bolts $m$, $m$, with the hub C, between them. The cutters $c$, $d$, are then adjusted according to the size of the hole required to be made, the cutter $c$, extending out sufficiently from the arbor to cut a hole equal in diameter to the front orifice of the intended hole and the blade $h$, adjusted obliquely with arbor corresponding to the taper form of the hole to be made. The implement is then placed in a vise, and the operator turns the arbor A, and the cutters $c$, $d$, pass into the hub, the screw $a$, and nut or bearing $o'$, feeding the cutters to their work, the cutter $c$, cutting a hole equal in diameter to the smaller end of the box which is to be fitted in the hub, and the cutter $d$, reaming out said hole in taper form corresponding to the conical form of said box.

The within described implement may be constructed at a very small cost, will perform the desired work in a perfect manner and be used by any person not much skilled in the use of mechanical tools.

I do not claim separately any of the parts herein shown and described; but,

I do claim as new and desire to secure by Letters Patent,

The arrangement and combination of the cutters $c$, $d$, and the arbor A, as and for the purpose herein shown and described.

STACY A. GARRISON.

Witnesses:
JOHN K. EDWARDS,
J. B. WHITE.